United States Patent
Su

(10) Patent No.: US 9,875,886 B1
(45) Date of Patent: Jan. 23, 2018

(54) DOUBLE-ENDED CERAMIC METAL HALIDE LAMP

(71) Applicant: Robert Su, Chino, CA (US)

(72) Inventor: Robert Su, Chino, CA (US)

(*) Notice: Subject to any disclaimer, the term of this patent is extended or adjusted under 35 U.S.C. 154(b) by 0 days.

(21) Appl. No.: 15/368,654

(22) Filed: Dec. 4, 2016

(51) Int. Cl.
| | |
|---|---|
| *H01J 31/14* | (2006.01) |
| *H01J 61/82* | (2006.01) |
| *H01J 61/26* | (2006.01) |
| *H01J 61/34* | (2006.01) |
| *H01J 61/36* | (2006.01) |
| *H01J 9/32* | (2006.01) |
| *H01J 9/39* | (2006.01) |
| *H01J 9/24* | (2006.01) |
| *A01G 9/20* | (2006.01) |

(52) U.S. Cl.
CPC .............. *H01J 61/827* (2013.01); *A01G 9/20* (2013.01); *H01J 9/247* (2013.01); *H01J 9/323* (2013.01); *H01J 9/39* (2013.01); *H01J 61/26* (2013.01); *H01J 61/34* (2013.01); *H01J 61/366* (2013.01)

(58) Field of Classification Search
CPC .......... H01J 61/827; H01J 61/366; H01J 9/39; H01J 9/247; H01J 61/26; H01J 9/323; H01J 61/34; A01G 9/20
See application file for complete search history.

(56) References Cited

U.S. PATENT DOCUMENTS

| | | | | |
|---|---|---|---|---|
| 5,138,227 A | * | 8/1992 | Heider ................ | H01J 61/368 313/332 |
| 2008/0315769 A1 | * | 12/2008 | Boroczki .............. | H01J 9/042 313/618 |
| 2011/0187257 A1 | * | 8/2011 | Shido .................... | H01J 61/30 313/46 |
| 2014/0015403 A1 | * | 1/2014 | Gibson, III .......... | H01J 61/125 313/573 |
| 2014/0333192 A1 | * | 11/2014 | Checca ................ | H01J 61/545 313/3 |
| 2014/0354175 A1 | * | 12/2014 | Iida ....................... | H01J 61/827 315/291 |

* cited by examiner

*Primary Examiner* — Donald Raleigh
(74) *Attorney, Agent, or Firm* — Raymond Y. Chan; David and Raymond Patent Firm

(57) ABSTRACT

A double-ended ceramic metal halide lamp includes a luminous tube; at least two illuminators serially connected with each other deposed inside the luminous tube; and at least one ring-shaped retainers arranged between two illuminators to support the illuminators located along a central line of the luminous tube. A manufacturing method for a ceramic metal halide lamp includes following steps: (1) Arrange at least two serially connected illuminators inside an interior of a luminous tube; (2) Seal two ends of the luminous tube by a press sealing technique; and (3) Extract out the gas inside the luminous tube to form an eyelet at a central portion of the luminous tube.

13 Claims, 2 Drawing Sheets

DOUBLE-ENDED CERAMIC METAL HALIDE LAMP

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a ceramic metal halide lamp, and more particularly to a double-ended ceramic metal halide lamp which can provide a high wattage ceramic metal halide lamp.

Description of Related Arts

High intensity discharge lamps, such as HPS, MH, and LED, are commonly used in large area lighting application, and especially for the indoor growers, the above mentioned HID lamps are commonly used to grow corps without using sunlight indoors. In the current market, the ceramic metal halide lamps are provided in the market which can be used to provide efficient crop light that allows more harvest for less power. Compared with the other HID lamps, the ceramic metal halide lamps can be operated at higher temperature which is adapted to boost performance and quality-of-light characteristics, such as lumen maintenance, lamp color-shift and spread stability, color rendering index, and dimming.

However, the ceramic metal halide lamps have several drawbacks. Since the ceramic metal halide lamps are operated under a high temperature, throughout their lifetime, the light output of the ceramic metal halide lamps is gradually reduced, and the power consumption is gradually increased. Therefore, 315 W ceramic metal halide lamps are commonly used and limited in our daily life, and a higher wattage ceramic metal halide lamp is highly desired to provide to satisfy our daily life requirement.

SUMMARY OF THE PRESENT INVENTION

The invention is advantageous in that it provides a double-ended ceramic metal halide lamp which comprises at least two illuminators serially connected with each other to provide a high wattage lamp without alter the overall structure for the conventional high intensity discharge lamp.

Another advantage of the invention is to provide a double-ended ceramic metal halide lamp, wherein the illuminators are 315 W ceramic metal halide lamp, so a total wattage of all illuminators is 945 W.

Another advantage of the invention is to provide a double-ended ceramic metal halide lamp which comprises a plurality of U-shaped connectors arranged on two opposed ends of each illuminators to provide buffering clearances and buffering forces for connections between two illuminators.

Another advantage of the invention is to provide a double-ended ceramic metal halide lamp which comprises at least two getters attached on one of two U-shaped connectors between the two illuminators to absorb excess hydrogen, so as to protect the functions of the double-ended ceramic metal halide lamp.

Another advantage of the invention is to provide a double-ended ceramic metal halide lamp which comprises at least two ring-shaped retainers extended through one of the U-shaped connectors to an adjacent U-shaped connectors to bias against an inner wall of the luminous tube to support the illuminators arranged along a central line of the illuminous tube.

Another advantage of the invention is to provide a double-ended ceramic metal halide lamp, wherein two opposed ends of the luminous tube are sealed and a vacuum space is formed inside the luminous tube to protect functions of the illuminators.

Another advantage of the invention is to provide a double-ended ceramic metal halide lamp, wherein the overall structure of the double-ended ceramic metal halide lamp doesn't nor alter in order to satisfy the above mentioned advantages, so there is no need to purchase new ballasts and fixtures for replacing the original lamp device into the present invention.

Additional advantages and features of the invention will become apparent from the description which follows, and may be realized by means of the instrumentalities and combinations particular point out in the appended claims.

According to the present invention, the foregoing and other objects and advantages are attained by a double-ended ceramic metal halide lamp, comprising:

a luminous tube;

at least two illuminators serially connected with each other deposed inside the luminous tube; and at least one ring-shaped retainers arranged between two illuminators to support said illuminators located along a central line of the luminous tube.

In accordance with another aspect of the invention, the present invention comprises a manufacturing method for a double-ended ceramic metal halide lamp, comprising following steps:

(1) Arrange at least two serially connected illuminators inside an interior of a luminous tube;

(2) Seal two ends of luminous tube by a press sealing technique; and (3) Extract out the gas inside the luminous tube to form an eyelet at a central portion of the luminous tube.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
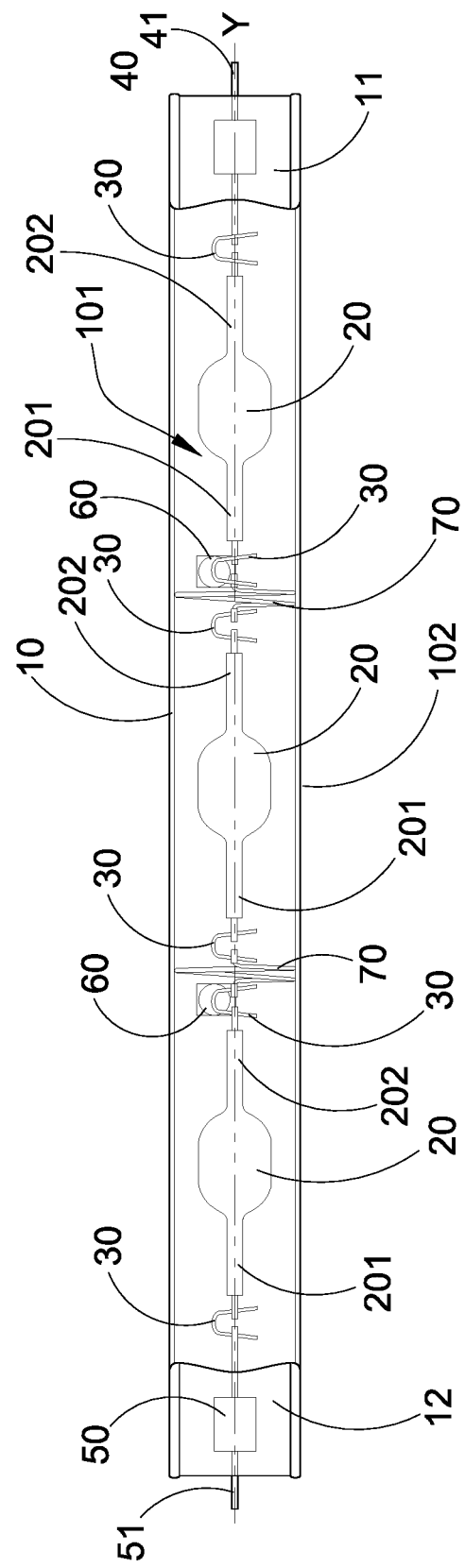
FIG. 1 is a perspective view of a double-ended ceramic halide lamp according to a first preferred embodiment of the present invention.
Figure 2:
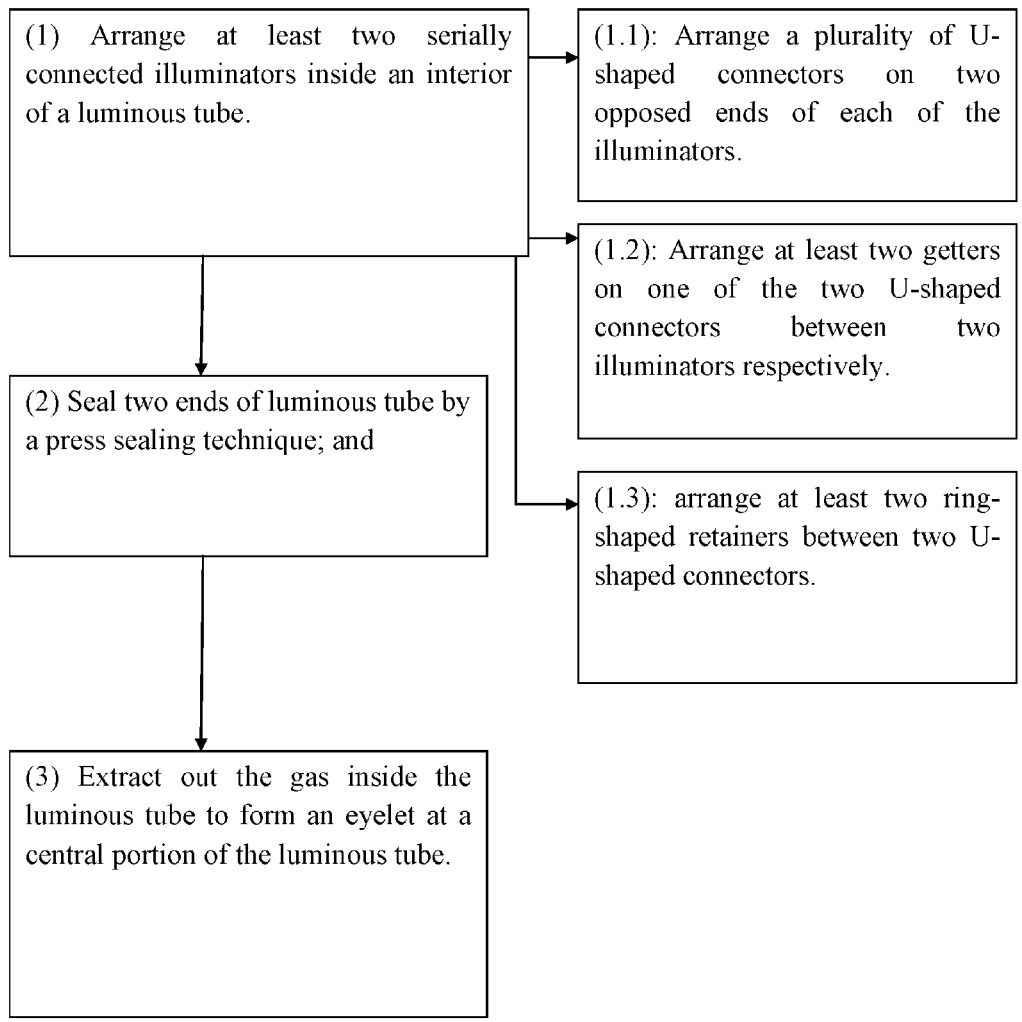
FIG. 2 is a block diagram of a manufacturing method for a double-ended ceramic halide lamp according to a second preferred embodiment of the present invention.

Referring to FIG. 1 of the drawings, a double-ended ceramic metal halide lamp according to a first preferred embodiment of the present invention is illustrated, wherein the double ended ceramic metal halide lamp comprises a luminous tube 10 having two sealed ends 11, 12 to define an interior 101, at least two illuminators 20 serially connected arranged along a central line Y of the luminous tube 10 and deposed inside the interior 101, and at least four U-shaped connectors 30 adapted to provide electrical connection between each of the illuminators 20.

Accordingly, each of the illuminators 20 is arc-tube having a wall formed of a ceramic or other suitable material, wherein each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage, wherein each of the illuminators 20 are conventional ceramic metal halide lamps, which comprises an ionizable fill disposed in an interior space of the illuminator 20, the ionizable fill comprising an inert gas and a halide component, and two electrodes positioned within the discharge vessel so as to energize the fill when an electric current is applied thereto. It is worth to mention that each of the illuminators 20 is a 315 W ceramic metal halide lamp, so if three of the illuminators 20 are serially connected with each other, the total energy used of the present invention is 945 W.

It is worth mentioning that the interior of the luminous tube 10 is a vacuum space to insulate the illuminators 20, so after the two sealed ends 11, 12 are sealed by press sealing technique, the gas inside the interior of the luminous tube 10 is extracted out to form the vacuum space from a central of the luminous tube 10 to from an eyelet. The press sealing techniques are well known in the art. And, each of the two sealed ends 11, 12 of the luminous tubes 10 is formed as a square tab adapted to engage with a socket of a lamp holder of an external fixture. It is worth to mention that the structure of the luminous tube 10 is the same as the conventional 1000 W high pressure sodium lamp, so the double-ended ceramic metal halide of the present invention can be installed on the ballast and fixture designed for the conventional 100 W high pressure sodium lamp, so no additional ballasts and fixtures are required to purchase in order to replace the 1000 W high pressure sodium lamp to 945 W double-ended ceramic metal lamps.

The ceramic metal halide lamp further comprises a first terminal 40 and a second terminal 50 formed on two sealed ends 11, 12 of the luminous tubes 10, and two electrical leads 41, 51 are extended from the two opposed ends 201, 202 of the illuminators 20 through the first and second terminals 40, 50 respectively. The two electrodes of each of the illuminators 20 are serially connected with each other to form the two opposed ends 201, 202 of the illuminators, and are connected through the two sealed ends 11, 12 of the illuminous tubes 10 to two electrical leads 41, 51 respectively.

Accordingly, the U-shaped connectors 30 are arranged on two opposed ends 201, 202 of each of the illuminators 20, wherein each of the U-shaped connectors 30 provides a buffering clearance between the two illuminators 20, so a buffering force is provided from each of the U-shaped connector 30. During the manufacturing of the ceramic metal halide lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

The ceramic metal halide lamp further comprises at least two getters 60, wherein each of the getters 60 is arranged between two illuminators 20 and attached on one of the U-shaped connectors 30 arranged between two illuminators 20. Therefore, the U-shaped connectors 30 can define a supporting surface to provide the getters 60 attached thereon, and the getters 60 are adapted to absorb excess hydrogen, so as to protect the function of the ceramic metal halide lamp of the present invention.

Accordingly, the ceramic metal halide lamp further comprises at least two ring-shaped retainers 70 connected between two U-shaped connectors 30, wherein each of ring-shaped retainers 70 is extended through one of the U-shaped connectors 30 to the other of the U-shaped connectors 30 to bias against an inner wall of the luminous tube 20. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube.

A manufacturing method for a ceramic metal halide lamp according to a second preferred embodiment of the present invention is illustrated, wherein the manufacturing method comprises following steps:

(1) Arrange at least two serially connected illuminators 20 inside an interior of a luminous tube 10;

(2) Seal two ends of luminous tube 10 by a press sealing technique; and (3) Extract out the gas inside the luminous tube 10 to form an eyelet 102 at a central portion of the luminous tube 10.

In the step (1), the illuminators 10 are arc-tubes, which are ceramic hadlide discharge tube, and which comprises an ionizable fill disposed in an interior space of the illuminators 20, the ionizable fill comprising an inert gas and a halide component, and two electrodes positioned within the discharge vessel so as to energize the fill when an electric current is applied thereto.

Accordingly, the manufacturing method further comprises a step (1.1): Arrange a plurality of U-shaped connectors 30 on two opposed ends of each of the illuminators 20, wherein the U-shaped connectors 30 not only provide electrical connection between each of the illuminators 20, but also provide buffering clearances between the two illuminators 20, so a buffering force is provided from each of the U-shaped connectors 30. During the manufacturing of the ceramic metal halide lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

Accordingly, the manufacturing method further comprises a step (1.2): Arrange at least two getters 60 on one of the two U-shaped connectors 30 between two illuminators 20 respectively. Therefore, the U-shaped connectors 30 can define a supporting surface to provide the getters 60 attached thereon, and the getters 60 are adapted to absorb excess hydrogen, so as to protect the function of the ceramic metal halide lamp of the present invention.

Accordingly, the manufacturing method further comprises a step (1.3): arrange at least two ring-shaped retainers 70 between two U-shaped connectors 30, wherein each of ring-shaped retainers 70 is extended through one of the U-shaped connectors 30 to the adjacent U-shaped connectors 30 to be biased against an inner wall of the luminous tube 10. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube 10.

In the step (2), each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage.

In the step (2), each of the two sealed ends 11, 12 of the luminous tubes 10 are formed as square tabs adapted to engage with a socket of a lamp holder of an external fixture. The press sealing techniques are well known in the art.

In the step (3), the interior of the luminous tube 10 is a vacuum space to insulate the illuminators.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A double-ended ceramic metal halide lamp, comprising:
   a luminous tube having two sealed ends selectively connected with a source of power, wherein each of said two sealed ends of said luminous tube is formed as a square tab adapted for engaging with a socket of a lamp holder of an external fixture;
   at least two illuminators serially connected with each other deposed inside said luminous tube;
   at least one ring-shaped retainers arranged between two illuminators to support said illuminators located along a central line of said luminous tube, wherein each of the illuminators has two opposed ends to receive current from said U-shaped conductors; and
   a plurality of U-shaped connectors located at two opposed ends of said illuminators adapted to provide electrical connections between each of said illuminators.

2. A double-ended ceramic metal halide lamp, comprising:
   a luminous tube having two sealed ends selectively connected with a source of power;
   at least two illuminators serially connected with each other deposed inside said luminous tube;
   at least one ring-shaped retainers arranged between two illuminators to support said illuminators located along a central line of said luminous tube, wherein each of the illuminators has two opposed ends to receive current from said U-shaped conductors;
   a plurality of U-shaped connectors located at two opposed ends of said illuminators adapted to provide electrical connections between each of said illuminators; and
   a first terminal and a second terminal formed on said two sealed ends of said luminous tube, and two electrical leads are extended from said two opposed ends of said illuminators through said first and second terminals respectively.

3. A double-ended ceramic metal halide lamp, comprising:
   a luminous tube;
   at least two illuminators serially connected with each other deposed inside said luminous tube;
   at least one ring-shaped retainers arranged between two illuminators to support said illuminators located along a central line of said luminous tube;
   a plurality of U-shaped connectors located at two opposed ends of said illuminators adapted to provide electrical connections between each of said illuminators; and
   at least two getters arranged between said illuminators and attached on one of said U-shaped connectors to absorb excess hydrogen.

4. A double-ended ceramic metal halide lamp, comprising:
   a luminous tube;
   at least two illuminators serially connected with each other deposed inside said luminous tube;
   at least one ring-shaped retainers arranged between two illuminators to support said illuminators located along a central line of said luminous tube;
   a plurality of U-shaped connectors located at two opposed ends of said illuminators adapted to provide electrical connections between each of said illuminators; and
   at least two ring-shaped retainers extended through one of said U-shaped connectors to an adjacent said U-shaped connectors to bias against an inner wall of said luminous tube, and is adapted to support said illuminators arranged along a central line of said luminous tube.

5. A manufacturing method for a ceramic metal halide lamp, comprising the steps of:
   (1) arranging at least two serially connected illuminators inside an interior of a luminous tube;
   (2) sealing two ends of said luminous tube by a press sealing technique; and
   (3) extracting out the gas inside said luminous tube to form an eyelet central portion of said luminous tube.

6. The manufacturing method, as recited in claim 5, wherein in the step (1), said illuminators are ceramic halide discharge tube.

7. The manufacturing method, as recited in claim 6, after the step (1), further comprising a step (1.1) of arranging two U-shaped connectors on two opposed ends of each of said illuminators to provide electrical connections between each of said illuminators.

8. The manufacturing method, as recited in claim 7, wherein said U-shaped connectors provide buffering clearances between said two illuminators and defined supporting surfaces, so a buffering force is provided from each of said U-shaped connectors.

9. The manufacturing method, as recited in claim 6, after the step (1.1), further comprising a step (1.2) of arranging at least two getters on one of said two U-shaped connectors between said two illuminators respectively to absorb excess hydrogen.

10. The manufacturing method, as recited in claim 9, after the step (1.2), further comprising a step (1.3) of arranging at least two ring-shaped retainers between two U-shaped connectors to support said illuminators arranged along a central line of said luminous tube.

11. The manufacturing method, as recited in claim 10, wherein each of said ring-shaped retainers is extended through one of said U-shaped connectors to an adjacent said U-shaped connectors to be bias against an inner wall of said luminous tube.

12. The manufacturing method, as recited in claim 7, wherein in the step (2), said luminous tube has two sealed ends selectively connected with a source of power.

13. The manufacturing method, as recited in claim 12, wherein each of said two sealed ends of said luminous tube formed as square tabs adapted for engaging with a socket of a lamp holder of an external fixture.

\* \* \* \* \*